Dec. 26, 1961 F. R. MARSHALL 3,014,611
REFRIGERATION APPARATUS
Filed Nov. 20, 1959 2 Sheets-Sheet 1

INVENTOR
FRANCIS R. MARSHALL
BY William J. Foley
ATTORNEY

Dec. 26, 1961 F. R. MARSHALL 3,014,611
REFRIGERATION APPARATUS
Filed Nov. 20, 1959 2 Sheets-Sheet 2

WITNESSES.
Edward A. Sager
D. J. McCarty

INVENTOR
FRANCIS R. MARSHALL
BY William J. Foley
ATTORNEY

United States Patent Office 3,014,611
Patented Dec. 26, 1961

3,014,611
REFRIGERATION APPARATUS
Francis R. Marshall, Columbus, Ohio, assignor to Westinghouse Electric Corporation, East Pittsburgh, Pa., a corporation of Pennsylvania
Filed Nov. 20, 1959, Ser. No. 854,288
7 Claims. (Cl. 220—9)

This invention relates to insulated structures, especially refrigerator cabinets constructed from insulated panels, and further relates to improved methods of joining together insulated wall panels.

It is a well-known technique in the refrigerator cabinet art to construct insulated cabinets from so-called "sandwich panels." The latter comprise a foamed core of insulation material, such as polystyrene, which is adhesively secured between a pair of rigid sheets. These panels are then joined together, according to past practice, by coating their joint surfaces with cement and holding them in contact while the cement is cured, as by heating. Although this construction technique is attractively economical, it has not displaced more conventional constructions largely because cemented joints are not as strong as desired, and because they are not moisture resistant unless extreme care is exercised in their formation. Furthermore, if cement should get on the exterior surface of a panel its finish would be marred, with the result that there is an objectionably high rejection rate with this method.

According to the present invention, sandwich panels are joined together by holding facing surfaces of their cores in spaced relationship in a manner to provide a passageway between these surfaces and into which is poured a foamable, or foamaceous, insulation material having adhesive qualities. This bonding material is more dense than the insulation material used for the panel cores; by expansion it completely fills the passageway; hence, it provides an effective barrier against water, odors, vapor and heat. Furthermore, the various passageways throughout the cabinet structure are preferably arranged to intercommunicate so that the aforesaid barrier is an unbroken one. And the passageways also communicate with the exterior of the cabinet through pour holes in the bottom and rear of the cabinet, thus minimizing the risk of marring the finish of the cabinet during pouring of the foamable material.

In the improved joint construction of this invention an improved molding strip is preferably inserted into each joint corner from the interior of the cabinet. This molding strip has a body which provides a decorative trim for the joint and closes the joint passageway to prevent the foamaceous material from exuding from the joint. The molding strip is capable of staying in place under pressure of the expanding material because it is provided with a root portion having a flexible barb or shoulder which, once inserted into the passageway, resists the forces of the expanding material.

Additionally, the invention provides for a water barrier at those joints between horizontally extending panels and vertically extending side panels. This is accomplished by extending the joint passageway vertically through the relatively porous core of the side panel an appreciable distance above the horizontal panel. This extension passageway is filled with the same dense, foamaceous material used to join the panels together; and since this material is impervious to water, it provides a water barrier between the facing sheets of the side panel.

The various objects, features and advantages of the invention will appear more fully from the detailed description which follows, taken in connection with the accompanying drawings, forming a part of this application, in which.

Figure 4:
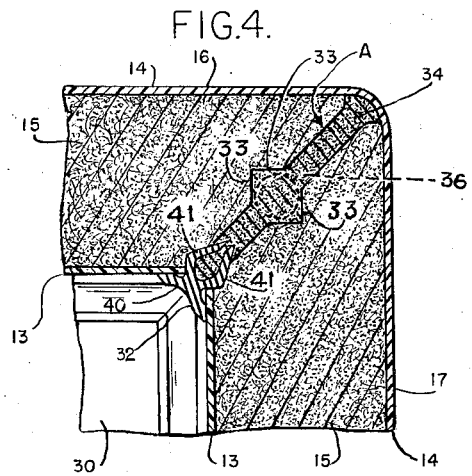
FIG. 4 is an enlarged vertical sectional view of a corner joint between the top panel and one side panel.

The invention, as shown in the drawings, is applied to a domestic refrigerator cabinet 10 having insulated wall structure defining a storage compartment 11, and a door 12 for closing the compartment at the front. The wall structure is made from so-called "sandwich panels" comprising, as shown in FIG. 4, a pair of rigid plastic or metal facing sheets 13 and 14, and a body, or core, 15 of foamed insulation material such as low density polystyrene. Numeral 13 designates panel sheets facing the compartment 11; and numeral 14 designates sheets facing the exterior. The core 15 is disposed between the sheets 13 and 14 and adhesively secured to them.

For the sake of clarity, the joints between panels are given letter designations as the various panels are introduced, and later they are described in detail.

The wall structure of the cabinet 10 includes a horizontally extending top panel 16 and a pair of side panels 17 and 18, all made from a single sandwich board or wrapper. The latter is provided with notch-like grooves and is then folded to make joints A between the top panel 16 and each of the side panels 17 and 18.

The compartment is closed at the bottom-front by a horizontally extending panel 20 which is joined to the side panels 17 and 18 by joint B.

A conventional step in bottom-rear of the cabinet 10 provides the usual apparatus compartment 24 for housing a motor-compressor unit (not shown). The step is made from a single sandwich board and includes a vertically extending panel 26 and a horizontally extending panel 28. Joint B is extended to join panels 26 and 28 to side panels 17 and 18. The vertical step panel 26 and the bottom panel 20 are joined by joints C. And between the vertical step panel 26 and the horizontal step panel 28 there is an external corner joint D, best seen in FIGS. 3 and 5.

A vertically extending rear panel 30 closes the compartment 11 at the rear, a C joint again being employed between the rear panel 30 and the horizontal step panel 28. The rear panel 30 is joined to respective rear edge portions of the top panel 16 and side panels 17 and 18 by joint E. Joint E extends generally along an inverted U-shaped line.

In joints made according to the present invention the core surfaces of panels that are to be joined are held in spaced relationship; and they are utilized as at least part of a passageway between panels in which is poured foamaceous insulation material having adhesive qualities. The foamable material used to seal and bond the joints of the cabinet structure preferably produces a closed cell, lightweight, tough insulating body that is firmly bonded to the elements of the sandwich panels. Foamable polyurethane, also known as isocyanate, is preferably employed for this purpose, although other foamable materials having similar properties can be substituted therefor. It is desirable to mix the constituents of the foamable material, i.e. the basic polyurethane resin and a prepolymer, immediately prior to introducing the material into the passageways of the joints. Materials of this type commence to foam almost immediately after the constituents thereof are mixed, but remain viscous for a sufficiently long period of time to enable the material to flow into all regions of the joint. Expansion of the material, of course, insures that all voids, openings and passageways in and to the joint are filled. Within a matter of minutes the foamed, or expanded, material commences to cure and harden, thereby becoming structurally strong and becoming adhesively bonded to the panels.

The expansion of the bonding material in the passageway ensures intimate contact with all joint surfaces as it sets, and therefore assists in obtaining a leak-proof and lasting joint. Furthermore, all joint passageways intercommunicate in order to obtain an unbroken line of protection against leaks through the cabinet joints.

For reasons that will appear hereinafter, it is desirable to use several different joint constructions in making an insulated cabinet structure from sandwich panels. It will suffice to say, for the present, that the type of joint selected for joining together a given two panels may be dictated, at least in part, by requirements of pour hole locations and the attitude of pour passages leading to the joint passageway.

JOINT A

Figure 2:
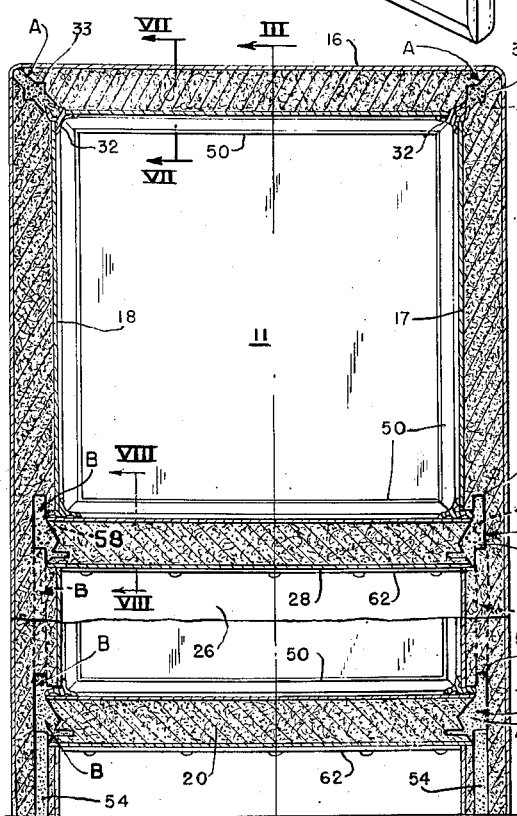
FIG. 2 is a vertical sectional view of the cabinet of FIG. 1, taken parallel to the rear panel thereof along line II—II of FIG. 3.

Corner joint A is best seen in FIGS. 2 and 4. It is made from a sandwich board provided with notch-like grooves and folded along the grooves so that the edge surfaces of the panel cores 15 at the joint A are in mutually facing, spaced relationship. These surfaces define, together with the inner surface of the outer sheet 13 and a unique molding 32, a tubular passageway 34 which extends from front to rear through the joint. In addition, opposed portions of the mutually facing core surfaces are recessed, or grooved, as indicated at 33, to provide an enlargement of passageway 34 along the length thereof and intermediate the facing sheets 13 and 14. The enlargement of passageway 34 provides a relatively open flow region to permit foamable material introduced at one end of the joint to flow throughout the length of the joint before completing its expansion and thereby insures a uniform, filled joint.

For closing the front end of the passageway 34 during the pouring operation a thin sheet of plastic material (not shown) is clamped or otherwise removably secured to the cabinet front. The bonding material is introduced to each passageway 34 through a pour hole 36 provided in the rear panel 30 in a position to communicate with the enlarged region of passageway 34. (See FIG. 5.) But before pouring, the cabinet is assembled, clamped in a fixture, and placed in a position wherein the rear panel faces upwardly and passageway 34 extends vertically. The foamable material is then poured through holes 36 into the passageway. After the bonding material has expanded and solidified the pour hole may be suitably plugged to improve appearances, and the plastic sheet may be removed from the front of passageway 34, later to be covered by a decorative breaker strip 37 (see FIG. 1).

Figure 1:
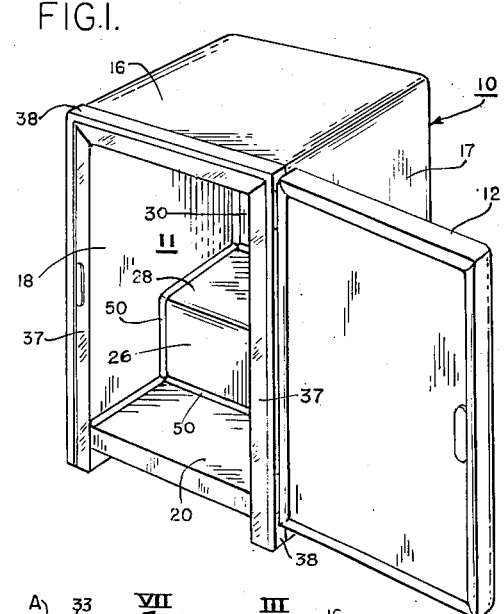
FIG. 1 is a perspective view of a domestic refrigerator cabinet embodying the invention.
Figure 3:
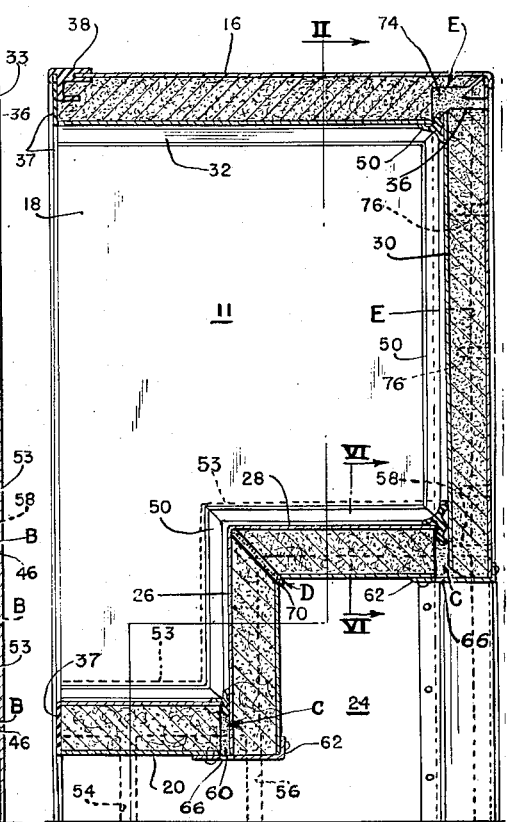
FIG. 3 is a vertical sectional view of the cabinet of FIG. 1, taken parallel to the side panels thereof along line III—III of FIG. 2.

As shown in FIGS. 1 and 3, an edge trim and reinforcing member 38 is employed to strengthen the front edges of the top panel 16 and side panels 17 and 18, and to prevent their outer sheets from being peeled off. This member is U-shaped; it has a groove in one flange; and it is adapted to be imbedded in the exposed edges of the panel cores with the edge of the outer panel sheets 14 received in the groove. Member 38 is described in greater detail and claimed in the copending application of Herbert A. Ehrenfreund, Serial No. 741,153, filed June 10, 1958, and assigned to the assignee of the present invention.

The molding 32 at joint A is preferably made unitarily by extrusion of resilient material. It is provided with a body strip 40 to cover the joint from the compartment side and to close the compartment 11 to the passageway 34. However, it is also constructed to resist ejectment from the joint by the foam expanding in the passageway 34. This is accomplished by means of a pair of root strips 41 connected to the body strip 40. The root strips 41 are shaped to act as barbs which flex to permit easy insertion into the passageway 34, after which they bear on the inner surface of the sheets 13 and cooperate with the body strip 40 to grip the same sheets between them. The gripping action is obtained because each root strip 41 makes an acute angle with the body strip 40.

JOINT B

Figure 6:
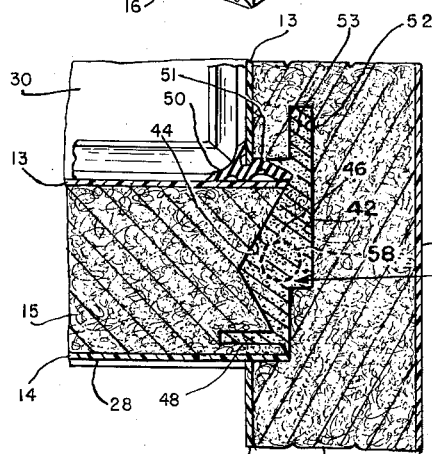
FIG. 6 is an enlarged vertical sectional view of the joint between the side panel and the horizontally extending panel portion of the step, taken along line VI—VI of FIG. 3.

Joint B is best illustrated in FIGS. 2, 3 and 6, there being such a joint on both sides of cabinet 10. Each of the side panels 17 and 18 is provided, in the inner face thereof, with a groove 42 which jogs from front to rear and is capable of receiving the full thickness of the edges of panels 20, 26 and 28. The latter are provided with V-shaped recesses 44 along their core edges so that, with the groove 42, a primary passageway 46 is formed between them. The V shape of the recesses 44 produces an enlarged flow area centrally of the primary passageway 46 to ensure distribution of the bonding material throughout the length of the joint. A thin slot 48 is cut in the cores of panels 20, 26 and 28 near their lower faces to lend a measure of compressibility to the panel edges to be received in groove 42, thereby facilitating assembly in case of a tight fit.

Joint B is hidden from the compartment side, and closed to the compartment 11, by means of a corner molding 50. Molding 50 is similar to molding 32, previously described, except that it has only one barbed root strip 51 to hold it in place where molding 32 has two root strips 41.

In the interest of reducing heat leakage, low density foam material is used throughout the cabinet 10 to make the cores 15, with the result they are relatively porous and liquids can seep through them. It is therefore desirable to protect against the possibility that liquids spilled in the compartment 11 will flow past the molding 50 and joint B, and then seep through the side panel core onto the floor. As an inexpensive solution to this problem, an elongated slot 52 is formed in groove 42 of the side panel core to produce an extension passageway 53 between side panel sheets 13 and 14. The extension passageway 53 extends vertically from the primary passageway 46 an appreciable distance above the horizontal panel (20, 28) neighboring it. Bonding material poured into the extension passageway 53 becomes a dense, water impervious body after it has set and therefore provides an effective liquid barrier.

Extending vertically through each of the side panels 17 and 18, from the bottom of cabinet 10 to the primary passageway 46, are pour passages 54 and 56. Passage 54 leads to the lower horizontal portion of passageway 46 extending along the side edge of bottom panel 20. Pour passage 56 leads to the vertical portion of passageway 46 extending along the side edge of vertical step panel 26.

The upper horizontal portion of passageway 46 is disposed between the side edge of horizontal step panel 28 and the side panel. A pour passage 58 therefor extends horizontally through the rear panel 30 to the rear of the cabinet 10.

JOINT C

Figure 8:
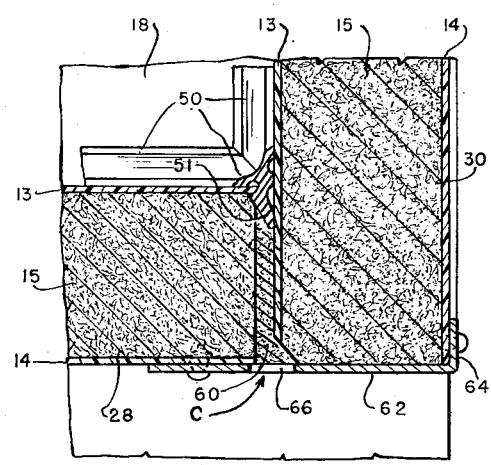
FIG. 8 is an enlarged vertical sectional view of the joint between the rear panel and the horizontally extending panel portion of the step, taken along line VIII—VIII of FIG. 2.

Referring now to FIGS. 3 and 8, it can be seen that between rear panel 30 and horizontal step panel 28 there is a right angle butt joint C. There is a similar joint C between bottom panel 20 and the vertical step panel 26. For the sake of brevity, only the joint between panels 28 and 30 is shown enlarged and described in detail. However, like reference numerals are used where corresponding parts of both joints are alike.

The bottom edge of rear panel 30 is flush with the outer sheet 14 of panel 28, the rear edge of panel 28 and the sheet 13 of panel 30 being in mutually facing, spaced relationship to define a passageway 60 between them. Molding 50, previously described, is used to close the passageway 60 to the compartment 11.

A horizontally elongated splice plate 62 is secured, as by screws, to the sheets 14 for closing the bottom of the passageway 60. It also covers the bottom edge of the rear panel core. And it has a flange 64 wrapped about the bottom of the rear panel 30 to reinforce this cabinet corner and to prevent the outer sheet 14 of the rear panel 30 from being peeled off.

Figure 5:
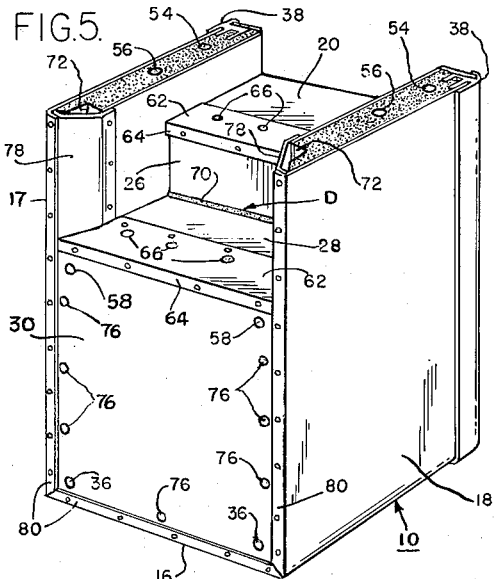
FIG. 5 is a rear perspective view of the cabinet of FIG. 1 inverted.

The splice plate 62 is provided with a series of pour holes 66 aligned with passageway 60 so that bonding material can be introduced through them from the bottom of the cabinet 10. This pouring operation is done most conveniently with the cabinet inverted, as shown in FIG. 5.

JOINT D

Joint D is a horizontally elongated, externally exposed corner joint between vertical panel 26 and horizontal panel 28 of the step. The latter is made by forming a notch-like groove through the core of a sandwich board and folding the board therealong. This places the respective core surfaces of the panels 26 and 28, edgewise, in mutually facing and spaced relationship, and with an elongated passageway 70 between them. Passageway 70 is open to the exterior at the underside of the cabinet step; but it is closed to the compartment 11 without the aid of molding.

Since the joint opening at the underside of the cabinet step is so inconspicuous, it does not have to be covered for appearance purposes. Hence, pour holes or pour passages are not required; and bonding material can be poured directly into the joint, along its length, after inverting the cabinet and tilting it about 45°.

JOINT E

Figure 7:
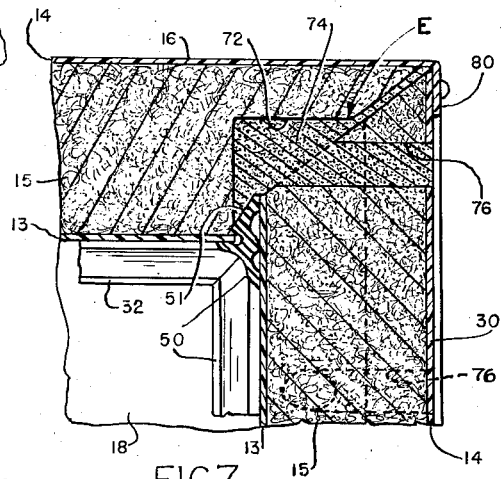
FIG. 7 is an enlarged vertical sectional view of the joint between the rear panel and the top panel, taken along line VII—VII of FIG. 2.

Joint E extends along an inverted U-shaped line between the edges of the rear panel 30 and the wrapper which comprises panels 16, 17 and 18. At joint E, the abutting edge surfaces of the rear panel 30 and the wrapper are mitered; and an elongated, stepped groove 72 is formed in the rear edge of the wrapper to define, with the edge of panel 30, a passageway 74 of triangular cross section. (See FIG. 7.) Passageway 74 is closed to compartment 11 by molding 50.

Along the length of joint E, rear panel 30 is provided with a series of horizontal pour passages 76 through which bonding material is introduced to the passageway 74.

For manufacturing convenience, the stepped groove 72 runs the entire length of the side panels 17 and 18. It is desirable to cover those portions of groove 72 which are below the rear panel 30. This is preferably accomplished by attaching channels 78 to the side panel sheets, as shown in FIG. 5.

At the rear of the cabinet 10, the top and side corners thereof are reinforced by flange extensions 80 of the outer wrapper sheet 14. These flange extensions 80 overlap the outer sheet 14 of the rear panel 30, protecting it from being peeled off.

Foamable material poured into joint E through rear panel pour passages 76 flows into passageway 74 throughout the length of the joint. As the material foams and expands it completely fills passageway 74 and flows outwardly through all of the spaces and the crevices between the edges of the panel cores 15 to securely seal and bond the joint.

This arrangement at joint E combines the structural rigidity of a mitered joint with the advantages of pouring the foamable joint material from the rear of the cabinet.

Summary

It should be apparent from the foregoing that the passageways of the joints intercommunicate with each other and the exterior of the cabinet. Also, the passageways, pour holes and pour passages are constructed and arranged in such a manner as to enable all of the joints to be filled either from the bottom or the rear of the cabinet 10, thereby minimizing changes of marring the cabinet finish or the cabinet accessories by having the foamable material come in contact therewith.

Joints may be poured in any order, but it is obviously more convenient to pour all joints having openings to the rear at one time, and to pour all joints having openings to the bottom at another time. It is preferred to pour open joint D last.

It is also preferred to assemble the cabinet 10 on a swingable fixture so that the component panels will be held in properly assembled relationship during the pouring operations, and so that the positions of the cabinet may be changed conveniently.

With the present invention, the panels of insulated cabinet structure are joined together more securely than previously, and the joints provide an effective barrier against leaks of water, vapor, odors and heat.

While the invention has been shown in but one form, it will be obvious to those skilled in the art that it is not so limited, but is susceptible of various changes and modifications without departing from the spirit thereof.

What is claimed is:

1. The method of joining together adjacent wall panels of a cabinet comprising the steps of providing between said panels a closed passageway which is bounded at least partly by the respective mutually facing surfaces of said panels, providing an opening to said passageway, and pouring foamaceous material having expansion and adhesive qualities through said opening into said passageway to expand therein and bond the respective mutually facing surfaces of said panels together.

2. The method of joining together adjacent panels of an insulated structure, wherein said panels comprise inner and outer sheets and a core of foamed insulation material sandwiched between said sheets, comprising the steps of providing between said panels a continuous, closed passageway which is bounded at least partly by the respective cores of said panels, providing an opening to said passageways, and pouring foamaceous insulation material having expansion and adhesive qualities through said opening into said passageway to expand therein and bond the respective cores of said panels together.

3. Insulated cabinet structure comprising a plurality of adjoining sandwich panels, each of said panels comprising first and second sheets and a core of insulation joined to said sheets and sandwiched between them, a passageway between said panels, said passageway extending generally along the projected line of meeting of said panels and to their respective cores, said passageway being in communication with the exterior of said cabinet structure and closed to the interior of said cabinet structure, and foamed insulating material in said passageway bonding the cores of said panels together.

4. Insulated cabinet structure including a plurality of adjoining panels each comprising first and second sheets and a core of insulation between said sheets, said panels being arranged in converging relationship so that the respective outer surfaces of said first sheets are in convergingly facing relationship and a space is provided between portions of the respective cores and the respective first sheets, improved molding closing the space between said first sheets and defining with said panels a passageway between said cores which is closed to the interior of said cabinet structure, and foamed adhesive material in said passageway bonding said panels to each other; said molding being made unitarily from resilient material and comprising an elongated body portion which contacts the outer surfaces of said first sheets, and an elongated root portion connected to said body portion, said root portion including a barb which is insertable through the space between said first sheets and thereafter contacts the inner surface of at least one of said first sheets and with said body portion grips said one first sheet.

5. Insulated cabinet structure comprising a plurality of adjoining panels each including a rigid sheet and a body of insulation secured to said sheet, said panels being arranged in spaced relationship with the respective outer surfaces of said sheets in convergingly facing relationship, improved molding closing the space between said sheets whereby a passageway closed to the interior of said cabinet structure is defined between said cores, and foamed adhesive material in said passageway bonding said panels to each other; said molding comprising an elongated body portion which contacts the outer surface of said sheets, and an elongated root portion connected to said body portion, said root portion including a barb which is insertable between said sheets into said passageway and thereafter contacts the inner surface of at least one of said sheets and with said body portion grips said one sheet.

6. Insulated cabinet structure including a horizontally extending bottom panel and a side panel which is joined to said bottom panel along a horizontally extending line and extends in a vertical direction above said bottom panel, said panels each comprising first and second sheets and a core of porous insulation sandwiched between said sheets, a primary passageway between said panels which is closed from the interior of said cabinet and extends generally along the horizontal line of meeting of said panels, an extension passageway extending vertically from said primary passageway into the core of said side panel an appreciable distance above said horizontal panel, and foamed insulation having adhesive and water impervious qualities in said passageways joining said bottom panel and said side panel to each other; the insulation in said extension passageway providing a liquid barrier between said first and second sheets of said side panel.

7. A corner joint for insulated cabinet structures formed of a notched and folded sandwich panel having facing sheets separated by a core of foamaceous material, the notching of said panel providing mutually facing edge surfaces for said core at the joint, said core surfaces being spaced from each other and providing a closed passageway through said joint provided with an opening thereto, at least one of said core surfaces having an elongated recess therein providing an enlargement of said passageway intermediate said facing sheets, and a foamed body of insulating material filling said passageway through said opening and adhering to said surfaces of the core.

References Cited in the file of this patent
UNITED STATES PATENTS

| | | |
|---|---|---|
| 1,671,084 | Meyercord | May 22, 1928 |
| 2,505,789 | Norquist | May 2, 1950 |
| 2,858,580 | Thompson et al. | Nov. 4, 1958 |

FOREIGN PATENTS

| | | |
|---|---|---|
| 387,450 | Great Britain | Feb. 9, 1933 |
| 784,319 | Great Britain | Oct. 9, 1957 |